United States Patent
Desclos et al.

(10) Patent No.: US 10,631,239 B2
(45) Date of Patent: Apr. 21, 2020

(54) HETEROGENEOUS NETWORK OPTIMIZATION UTILIZING MODAL ANTENNA TECHNIQUES

(71) Applicant: Ethertronics, Inc., San Diego, CA (US)

(72) Inventors: Laurent Desclos, San Diego, CA (US); Olivier Pajona, Antibes (FR)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 16/273,242

(22) Filed: Feb. 12, 2019

(65) Prior Publication Data

US 2019/0191365 A1 Jun. 20, 2019

Related U.S. Application Data

(63) Continuation of application No. 14/821,655, filed on Aug. 7, 2015, now Pat. No. 10,219,208.

(60) Provisional application No. 62/034,554, filed on Aug. 7, 2014.

(51) Int. Cl.
| | |
|---|---|
| H04W 48/18 | (2009.01) |
| H01Q 3/00 | (2006.01) |
| H04W 16/28 | (2009.01) |
| H04W 24/02 | (2009.01) |
| H04W 84/20 | (2009.01) |
| H04W 16/14 | (2009.01) |
| H04W 16/20 | (2009.01) |
| H04W 40/22 | (2009.01) |
| H04W 88/06 | (2009.01) |
| H01Q 5/00 | (2015.01) |
| H04W 88/04 | (2009.01) |

(52) U.S. Cl.
CPC .............. *H04W 48/18* (2013.01); *H01Q 3/00* (2013.01); *H01Q 3/005* (2013.01); *H04W 16/14* (2013.01); *H04W 16/20* (2013.01); *H04W 16/28* (2013.01); *H04W 24/02* (2013.01); *H04W 40/22* (2013.01); *H04W 84/20* (2013.01); *H01Q 5/00* (2013.01); *H04W 88/04* (2013.01); *H04W 88/06* (2013.01)

(58) Field of Classification Search
CPC ..... H04W 48/18; H04W 40/22; H04W 16/20; H04W 16/14; H04W 16/28; H04W 88/04; H04W 88/06; H04W 84/20; H01Q 3/00; H01Q 3/005; H01Q 5/00
See application file for complete search history.

(56) References Cited

U.S. PATENT DOCUMENTS

| | | |
|---|---|---|
| 6,134,234 A | 10/2000 | Kapanen |
| 6,765,536 B2 | 7/2004 | Phillips et al. |
| 6,987,493 B2 | 1/2006 | Chen |
| 7,068,234 B2 | 6/2006 | Sievenpiper |
| 7,215,289 B2 | 5/2007 | Harano |

(Continued)

*Primary Examiner* — Joshua Kading
(74) *Attorney, Agent, or Firm* — Dority & Manning, P.A.

(57) ABSTRACT

A communication system is described where multiple communication networks are simultaneously accessible from a plurality of fixed and/or mobile communication devices. A Master and Slave hierarchy is implemented among the communication devices to improve communication properties on one or multiple networks. A network system controller is implemented to select the network with optimal communication characteristics for subsets of communication devices as well as assigning Master status to a communication device within these subsets.

8 Claims, 10 Drawing Sheets

(56) References Cited

U.S. PATENT DOCUMENTS

| | | |
|---|---|---|
| 7,787,408 B2 | 8/2010 | Proctor, Jr. et al. |
| 7,911,402 B2 | 3/2011 | Rowson et al. |
| 8,359,051 B2 | 1/2013 | Marsden et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 9,015,393 B2 | 4/2015 | Korpinen et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,320,080 B2 | 4/2016 | Mardsen et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,580 B2 | 9/2017 | Desclos et al. |
| 2002/0126013 A1 | 9/2002 | Bridgelall |
| 2005/0181725 A1 | 8/2005 | Dabak |
| 2007/0173200 A1* | 7/2007 | Estrada ............... H04B 7/0814 455/67.11 |
| 2011/0222523 A1 | 9/2011 | Fu |
| 2013/0094439 A1 | 4/2013 | Moshfeghi |
| 2013/0132502 A1 | 5/2013 | Stacey |
| 2013/0195042 A1 | 8/2013 | Taori |
| 2015/0282142 A1 | 10/2015 | Dahlman |
| 2015/0311969 A1 | 10/2015 | Desclos |

\* cited by examiner

HETEROGENEOUS NETWORK OPTIMIZATION UTILIZING MODAL ANTENNA TECHNIQUES

CROSS-REFERENCE TO RELATED APPLICATIONS

This application is a continuation of U.S. application Ser. No. 14/821,655, filed Aug. 7, 2015, which claims benefit of priority with U.S. Provisional Ser. No. 62/034,554, filed Aug. 7, 2014; the contents of which are hereby incorporated by reference.

BACKGROUND OF THE INVENTION

Field of the Invention

This invention relates generally to the field of wireless communication; and more particularly, to systems and methods for operation on multiple communication networks and optimization of network parameters associated with these networks using modal antenna schemes and related techniques.

Description of the Related Art

Cellular networks and Wireless Local Area Networks (WLANs) are prevalent in society and have evolved to a level that moderate to high data rate transmissions along with voice communications are stable and reliable over large regions and throughout urban areas. Mobile user devices have progressed to the point of providing not only voice communications and low data rate text and email service but also high data rate internet connectivity. Continued adoption of mobile communications systems and introduction of new uses of cellular networks such as Machine to Machine (M2M) applications have put strain on the cellular systems in regard to providing consistent service and improved service in terms of higher data rates and less service interruptions front one year to the next. Similar congestion can be found on WLAN networks where a large number of users are causing strain on the systems. Continued improvements are sought after to improve communication system reliability as well as better command and control of communication nodes and the mobile devices utilizing these nodes.

As more devices such as cell phones. Tablets, and M2M devices are introduced on the networks and as more functions move to these devices, functions such as email, texting, internet access, location monitoring, household appliance monitoring, and other functions, it is becoming clear that in-building communication link performance for cellular networks is becoming a problem area that requires addressing. Cellular signals from base terminals located outdoors suffer high levels of signal strength reduction in-building. Distributed antenna systems (DAS) have been implemented to address this issue and can provide some relief, but these DAS systems also introduce new problems such as interference between in-building DAS systems and external cellular base terminals. WLAN works well indoors over moderate distances but do suffer from having less than complete signal coverage indoors due to scattering and blockage caused by walls, ceilings, and structures such as furniture. The higher frequencies that WLAN systems operate on, 2.4 GHz, tend 5 GHz, tend to decrease communication link range compared to lower frequency cellular systems.

SUMMARY OF THE INVENTION

A communication system is described where multiple communication networks (cellular, WLAN, or similar networks) are simultaneously accessible from a plurality of fixed and/or mobile communication devices. A Master and Slave hierarchy is implemented among the communication devices to improve communication properties on one or more of the networks. A network system controller is implemented to select the network with optimal communication characteristics for subsets of communication devices as well as assigning Master status to a communication device within these subsets.

DETAILED DESCRIPTION

Figure 1:
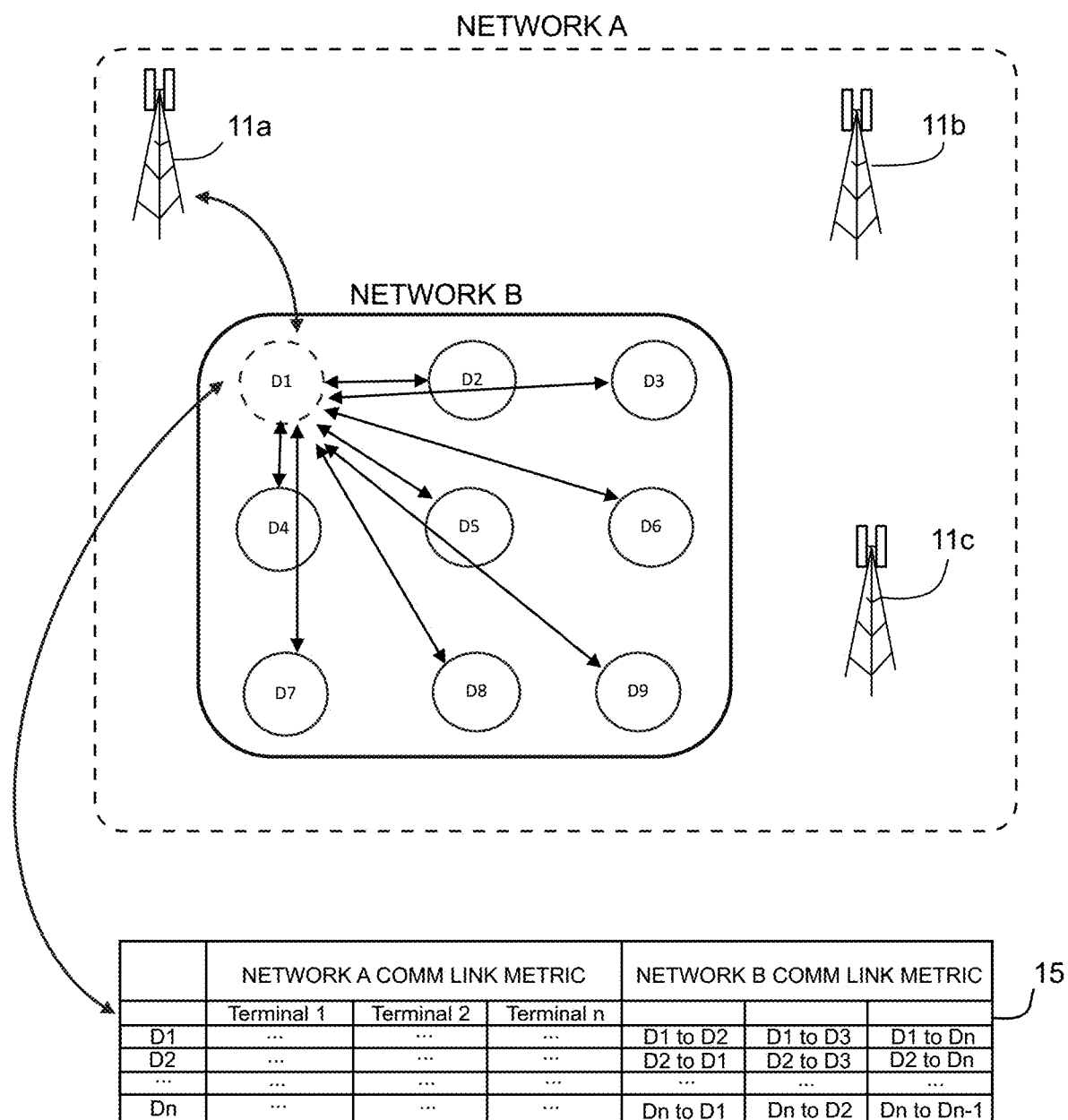
FIG. 1 illustrates a two communication networks designated Network A and Network B.

As cellular networks become more congested, off-loading users onto WLAN becomes an attractive solution. An area of improvement for today's devices and communication networks is better coordination between networks in regard to ensuring that all devices have access to cellular networks. When a group of communication devices are located in-building, and these devices are capable of communication on both cellular networks and WLAN, an improvement over today's system architecture would be to have the capability where an in-building device that has the best connectivity with the cellular network is used to control and coordinate data transfer of the other in-building communication devices on the cellular as well as the in-building WLAN network. Selecting the optimal in-building device to control and coordinate data transfer among the in-building devices will ensure that in-building communication devices that cannot connect to the external cellular network directly due to blockage and propagation challenges can use a data transfer capability from the selected device to pass critical information to the cellular network.

In the embodiments herein, multiple communication systems are described, such as 3G and 4G cellular networks. WLAN systems and networks, a plurality of fixed and/or mobile communication devices accessing these networks. Using dynamically configurable systems comprising adaptive antenna system and RF-front end circuits, where network parameters such as capacity and throughput are dynamically managed, operation can be alternated between cellular, WLAN and other networks to optimize communication parameters, and "Master" and "Slave" designation among groups of fixed and/or mobile communication devices can be dynamically adjusted to improve communication among the various networks and communication devices.

One example is a communication system where multiple communication networks are simultaneously accessible from a plurality of fixed and/or mobile communication devices. These fixed and/or mobile communication devices can be dynamically altered to improve communication link qualities with one or multiple networks by selecting the optimal radiation mode for the communication devices. The radiation mode will define a radiation pattern and polarization characteristic, with the radiation mode being a factor in determining the quality of the communication link in both transmit and receive operation. A Master and Slave hierarchy is implemented among the communication devices to improve communication properties on one or multiple networks. The selection of a Master communication device among a group of communication devices to direct network selection as well as radiation mode selection for these devices is novel. A network system controller is implemented to select the network with optimal communication characteristics for subsets of communication devices as well as assigning Master status to a communication device within these subsets.

In one embodiment of this invention two communication networks designated Network A and Network B are accessible by a group of communication devices. One of these communication devices, labeled D1, is designated "Master" status. The other communication devices are designated "slave" status. "Master" device D1 coordinates communication between Networks A and B and the other communication devices; this coordination includes radiation Mode selection for the communication devices to optimize communication link quality between the devices as well as between the communication devices and Network A and Network B. "Master" device D1 has optimal communication to Network A through Base Terminal 1 associated with Network A.

In another embodiment of this invention two communication networks designated Network A and Network B are accessible by a group of communication devices. One of these communication devices, labeled D1, is designated "Master" status. The other communication devices are designated "slave" status. "Master" device D1 coordinates communication between Networks A and B and the other communication devices; this coordination includes radiation Mode selection for the communication devices to optimize communication link quality between the devices as well as between the communication devices and Network A and Network B. During network operations and as information is transmitted and received between the multiple communication devices "Master" status is removed from communication device D1 and assigned to another communication device, for example D5. This decision is based on total network capacity and throughput, with the network system controller associated with Network A and/or B making the decision to switch "Master" status from one communication device to another.

In another embodiment of this invention multiple communication devices are fixed in position within a local area such as a building. These multiple communication devices operate on one communication network such as wireless local area network (WLAN). A communication device such as a cell phone capable of operation on both cellular and WLAN networks is within range of the fixed communication devices. The cell phone is assigned Master status from the cellular network and is used to coordinate communication between the fixed communication devices on the WLAN network. This coordination includes radiation mode selection for the WLAN devices to optimize communication link between the fixed WLAN devices and the cell phone. Communication between the cellular network and the fixed WLAN devices is implemented through the cell phone, allowing information from the fixed WLAN devices to be passed to the cellular network and vice versa.

Now turning to the drawings, FIG. 1 illustrates two communication networks designated Network A and Network B. Network A is a cellular network with three terminals 11a; 11b; 11c, as shown. Network B is a network constrained to a localized region within die communication footprint of Network A. Nine communication devices, which can be fixed or mobile devices, are labeled D1 thru D9, with all nine communication devices located within the communication footprint of Network B. Communication link quality from Network A is best to communication device D1; based upon this communication device D1 is designated "master" status. The other eight communication devices, D2 thru D9, are designated "slave" status. "Master" device D1 coordinates communication between Network A and the other communication devices; this coordination includes radiation Mode selection for the communication devices to optimize communication link quality between the devices as well as between the communication devices and Network A and Network B. "Master" device D1 has optimal communication to Network A through Terminal 1 (11a). A data table 15 is shown containing data associated with Networks A and B and the devices D1 thru Dn.

Figure 2:
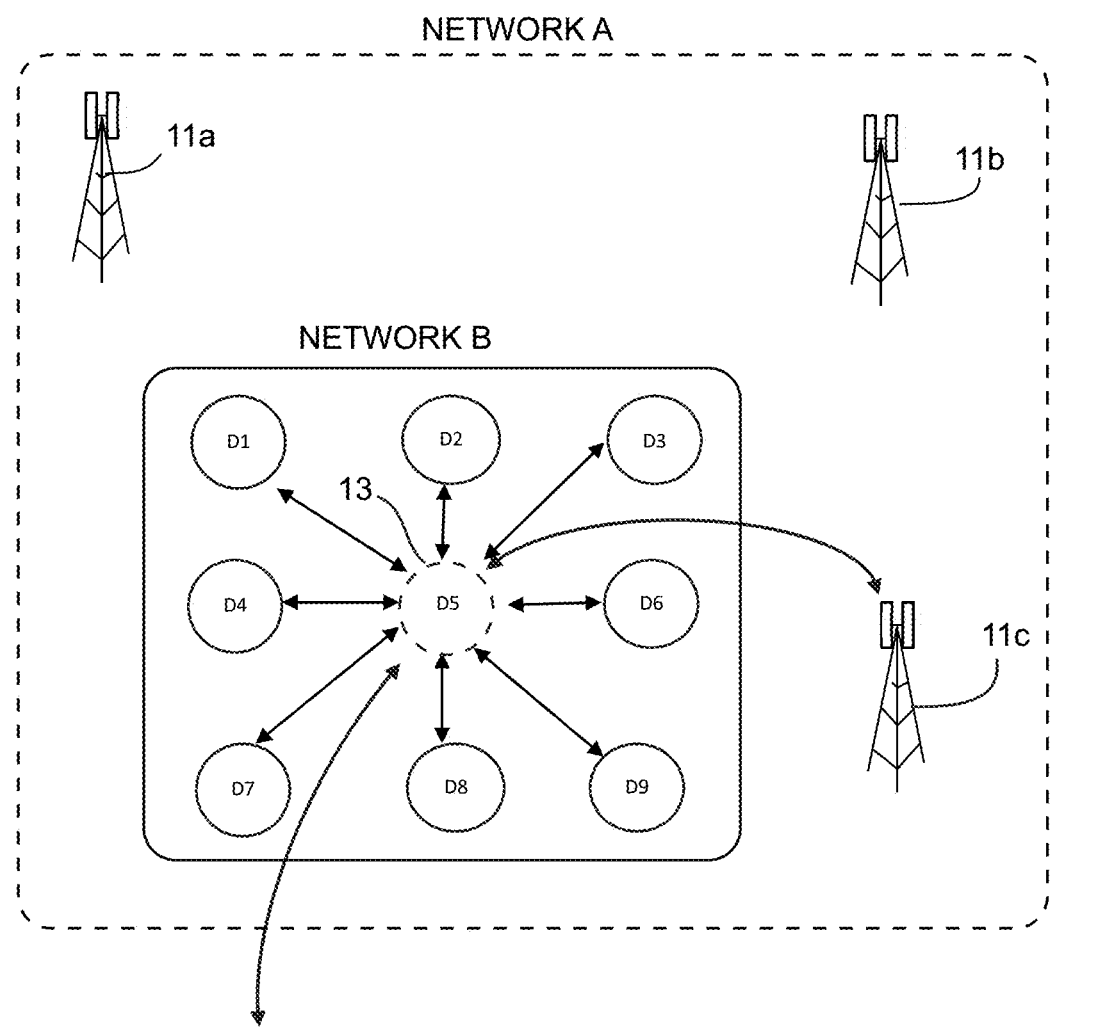
FIG. 2 illustrates the two communication networks designated Network A and Network B as shown in FIG. 1.

FIG. 2 illustrates the two communication networks designated Network A and Network B as shown in FIG. 1. Network A is a cellular network with three terminals 11a; 11b; 11c, as shown. Network B is a network constrained to a localized region within the communication footprint of Network A. Nine communication devices, which can be fixed or mobile devices, are labeled D1 thru D9, with all nine communication devices located within the communication footprint of Network B. In this case communication link quality from Network A is best to communication device D5; based upon this communication device D5 is designated "master" status. The other eight communication devices, D1 thru D4 and D6 thru D9, are designated "slave" status. "Master" device D5 coordinates communication between Network A and the other communication devices; this coordination includes radiation Mode selection for the communication devices to optimize communication link quality between the devices as well as between the communication devices and Network A and Network B. "Master" device D5 has optimal communication to Network A through Terminal 3 (11c). A data table 15 is shown containing data associated with Networks A and B and the devices D1 thru Dn.

Figure 3:
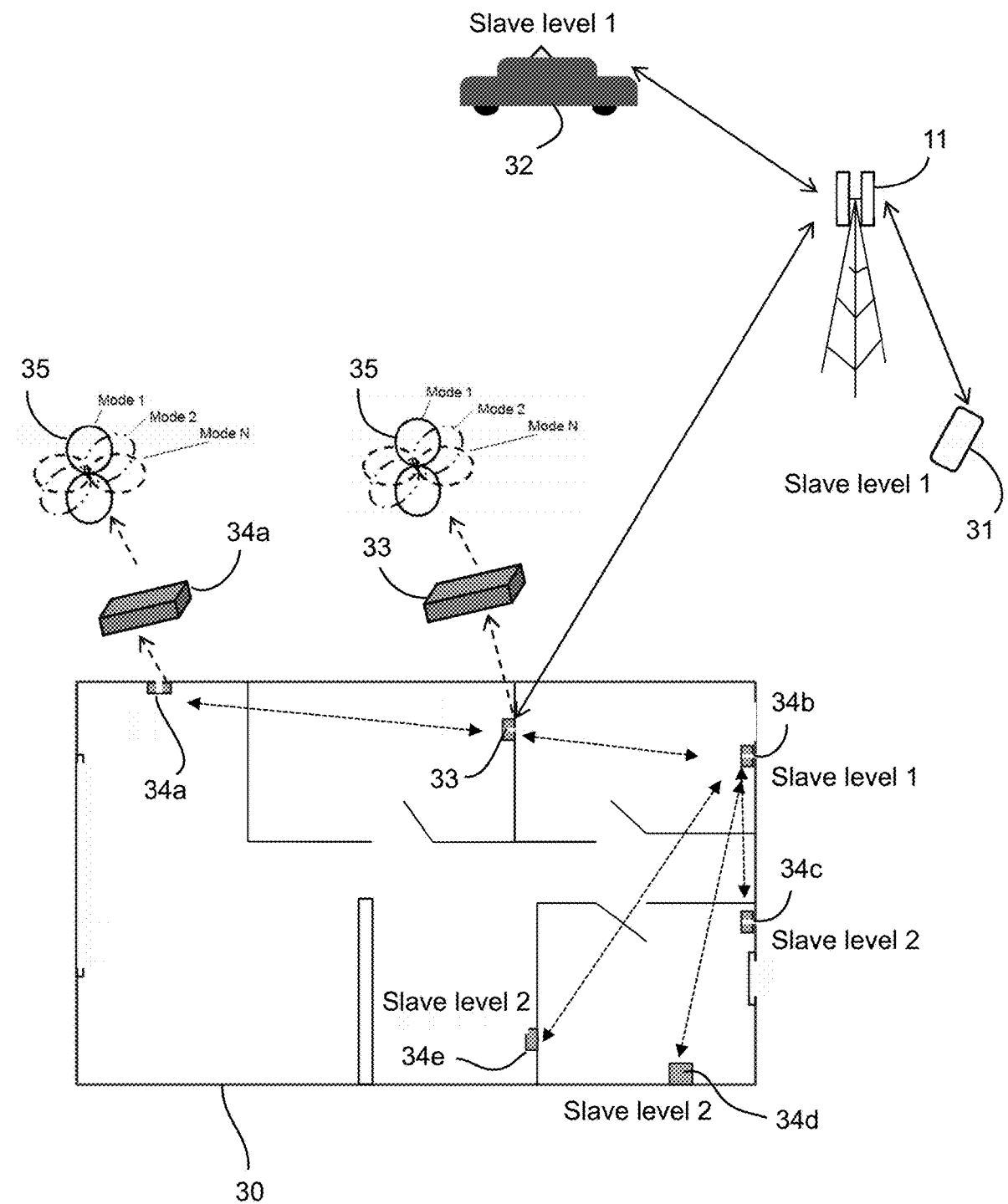
FIG. 3 illustrates communication devices in a building, with these communication devices operating on an in-building WLAN network.

FIG. 3 illustrates communication devices located in a building 30, with these communication devices 33, and 34(a-e) operating on an in-building WLAN network. A first cellular communication system 31 is located external to the building, with a base terminal 11 as shown. A second cellular communication system 32 is located external to the building and connected to base terminal 11. A master communication device 33 located in-building is designated "master" by the cellular system 31 and is tasked to select radiation modes for the communication devices 33 and 34(a-e). The "master"

device and a "slave" device are further shown with each device being capable of generating N radiation modes 35. In addition to being designated "master" or "slave", each device can be designated a level of priory such as "slave level 1" or "slave level 2". In this illustrated embodiment, the "master" device 33 is configured to communicate with the base terminal 11 for selecting a radiation mode for each modal antenna associated with the various network devices, and the master device is further configured to communicate data with the network devices for configuring the mode thereof such that the network is balanced and data transfer between the devices and between each device and the base terminal is optimized.

Figure 4:
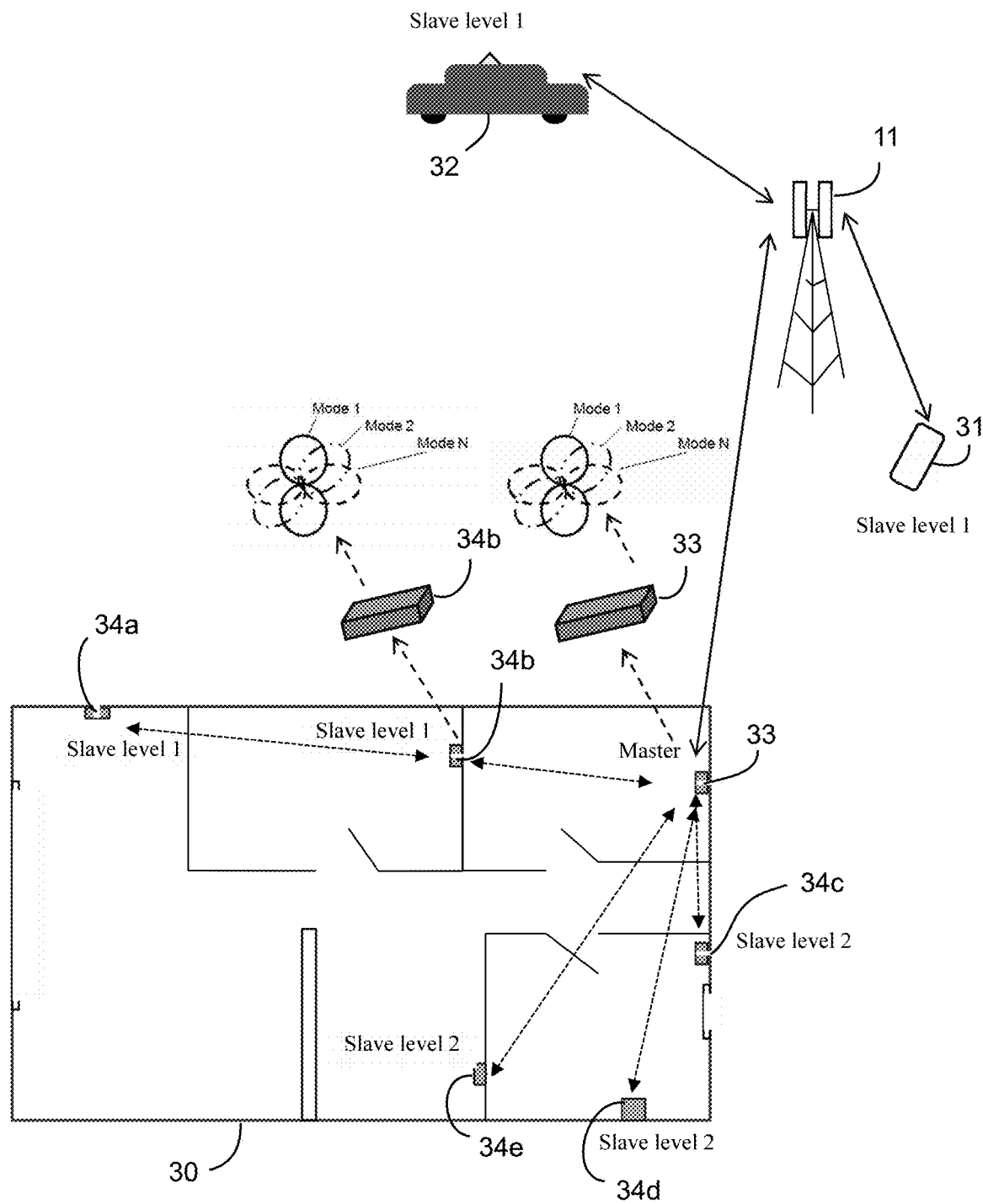
FIG. 4 illustrates the in-building and cellular communication systems shown in FIG. 3.

FIG. 4 illustrates the in-building and cellular communication systems shown in FIG. 3. In this scenario a different communication device is designated "master" status. The "master" device and a "slave" device are shown, and each device is capable of generating N radiation modes. In this embodiment, the communication devices are capable of switching between "master" and "slave" mode as needed for optimal communication link performance. The base terminal, or the devices, can be configured to select the status of each device as master or slave. As shown, a cellular network includes a base terminal 11 connected to a cellular device 31, a second device 32, and a master device 33 located in building 30. A plurality of wireless devices, in addition to the master device 33, are located in-building, including a first slave device 34a, second slave device 34b, third slave device 34c, fourth slave device 34d, and a fifth slave device 34e. The master device 33 is configured to communicate with base terminal 11 for sharing information for optimizing the network, wherein the network can be optimized by varying an antenna mode of one or more of the cellular and in-building devices.

Figure 5:
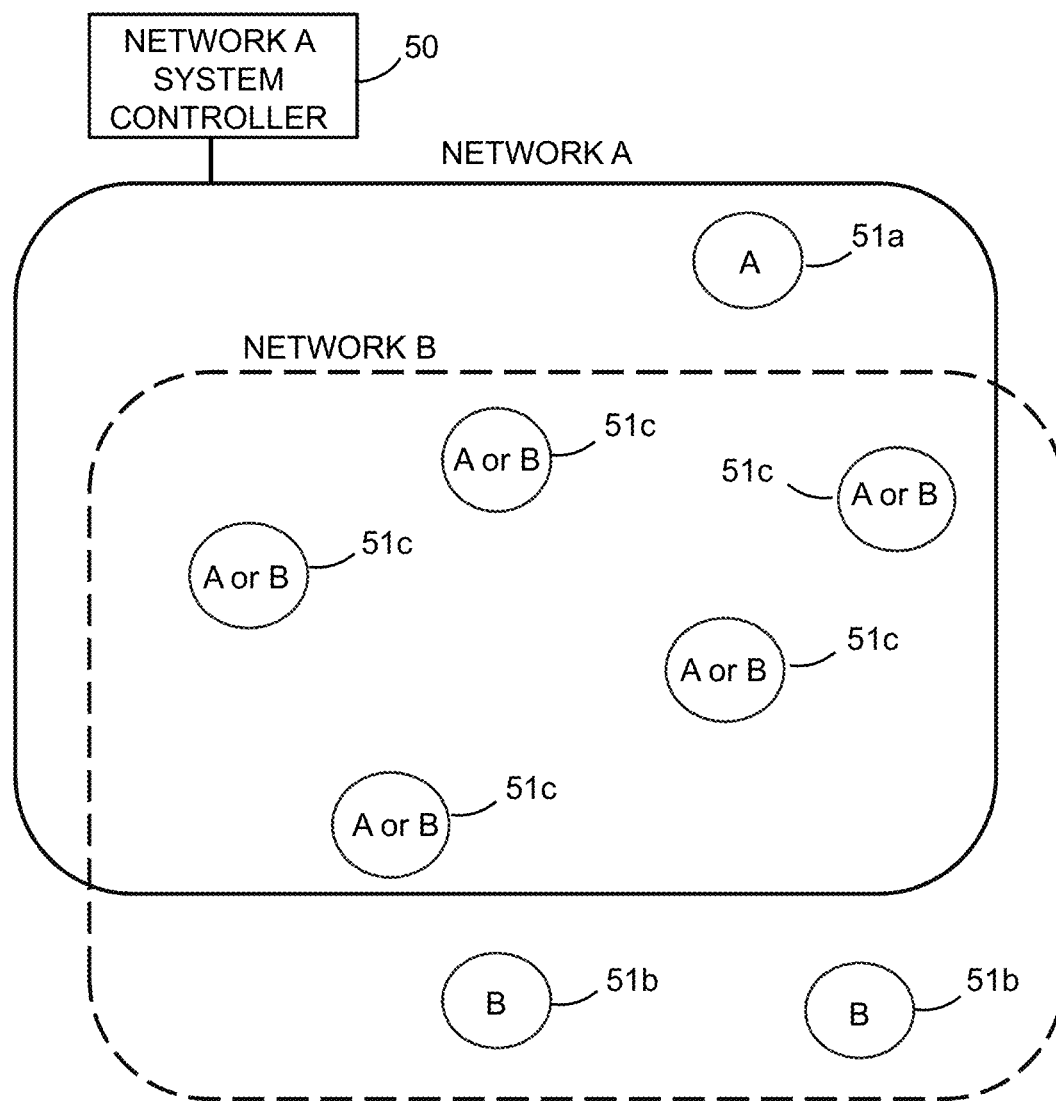
FIG. 5 illustrates two networks, Network A and Network B.

FIG. 5 illustrates two networks, Network A and Network B. Eight communication devices 51a; 51b; 51c are shown, with a first communication device 51a capable of operation on Network A only, two second communication devices 51b capable of operation on Network B only, and five third communication devices 51c each capable of operation on both Networks A and B. A system controller 50 for Network A is shown. In this embodiment, all communication devices are capable of operation on at least one of Networks A and B. The third communication devices 51c are each in range of both Networks A and B, and thus these devices can be allocated for communication with either Network A or Network B. Assuming the devices require equal access, four of the eight devices can be configured to link with Network A whereas the remaining four devices can be configured to communicate with Network B. Since only one first device is limited to access Network A, three of the third devices can be selected and configured to link with Network A, whereas the remaining two third devices can be selected and configured to link with Network B, such that the load of devices on these networks is balanced. One method for linking devices with respective networks is to adjust a radiation pattern mode of the antenna of each device as detailed herein, such that a gain maxima or null is directed toward each network access point or terminal. Here, the system controller for Network A manages access to network A by communicating with the devices and providing antenna mode instructions.

Figure 6:
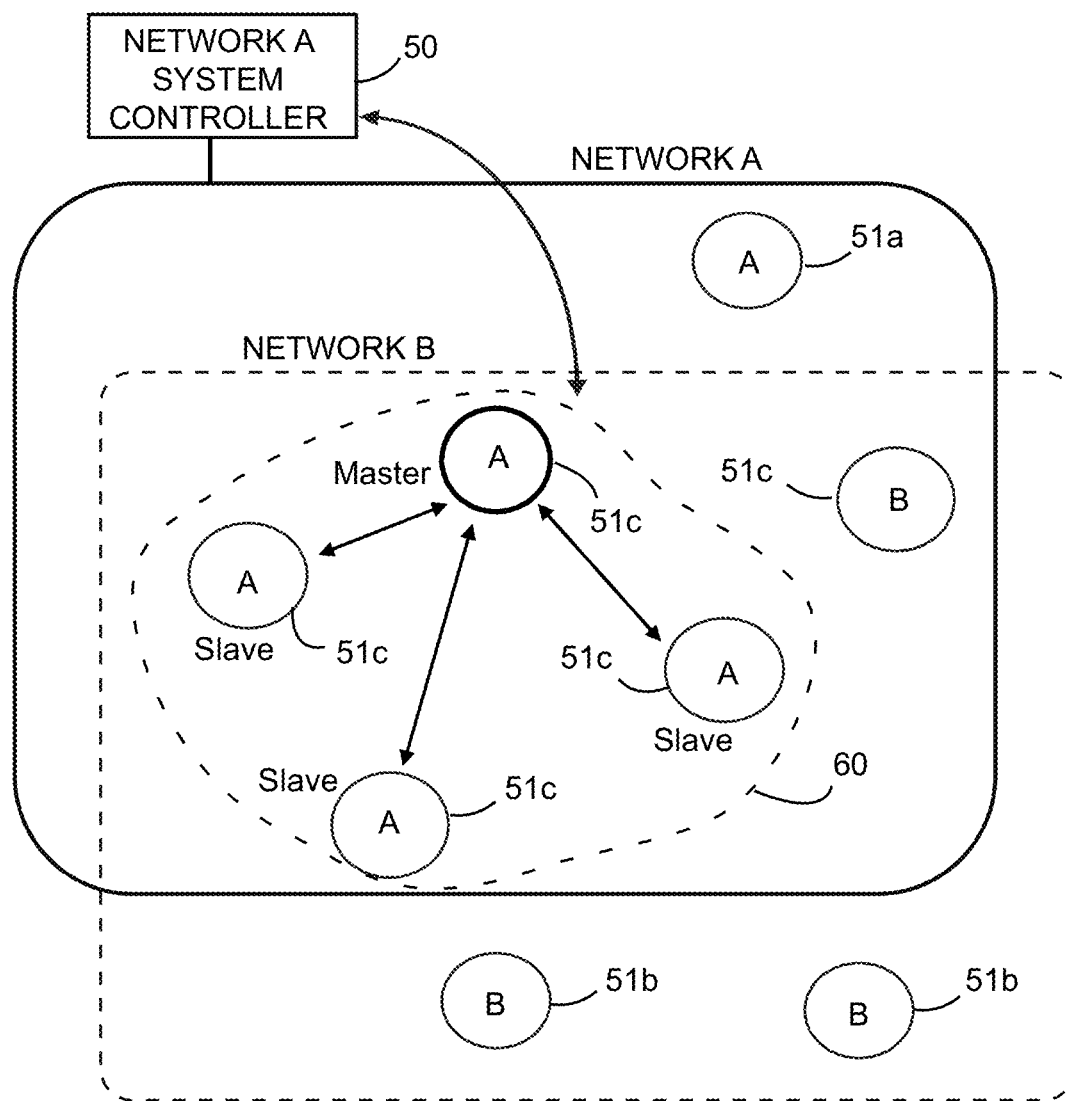
FIG. 6 illustrates the two networks shown in FIG. 5.

FIG. 6 illustrates the two networks shown in FIG. 5 (Network A and Network B). Eight communication devices are shown, with a first communication device 51a capable of operation on Network A, two second communication devices 51b capable of operation on Network B, and five third communication devices 51c capable of operation on Networks A and B. For the five third communication devices capable of operation on Networks A and B, a sub-group 60 of four sub-devices is formed, with one sub-device designated "master" with the other three sub-devices designated "slave" status. These four sub-devices communicate using Network A. A system controller for Network A is shown, the system controller designates each device as "master" or "slave". The selected master device can receive and/or transmit data from Network A to one or more slave devices in the sub-group 60. The sub-group is formed to assign "master" and "slave" status to each device for providing improved communication link performance for devices in poor reception areas.

Figure 7:
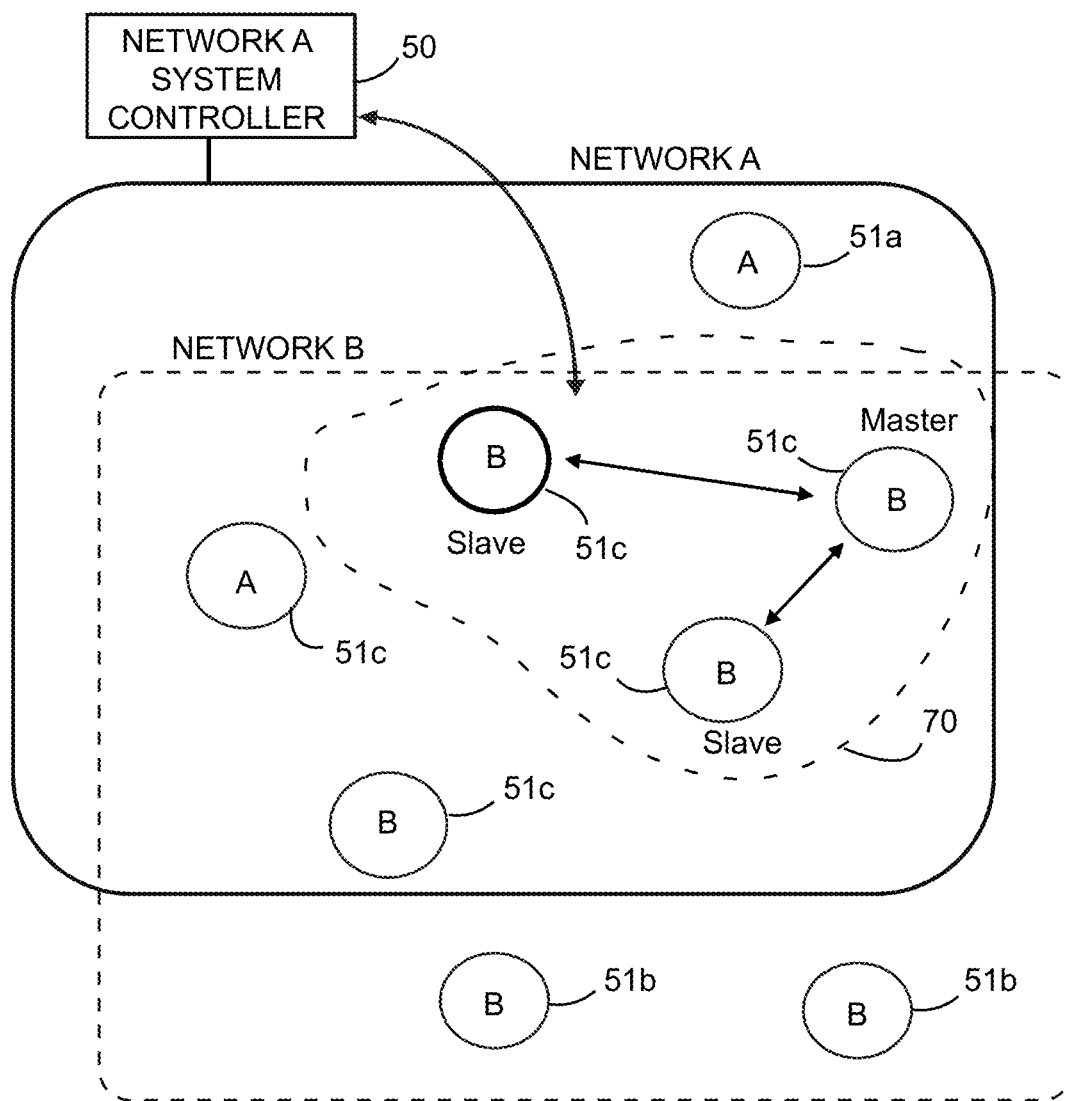
FIG. 7 illustrates the two networks shown in FIG. 6.

FIG. 7 illustrates the two networks shown in FIG. 6. A different sub-group 70 is formed and is shown, with three of the third communication devices used to form this sub-group 70. As detailed in FIG. 6 and commonly illustrated here, the system includes a first device 51a capable of communicating with network A only, two second devices 51b each capable of communicating with Network B only, and five third-devices each capable of communicating with both Network A and Network B. Three of the five third-devices are configured in sub-group 70. One of the third communication devices in sub-group 70 is designated "master" status with the other two devices in the sub-group 70 designated "slave" status. These three devices communicate using Network B. A system controller for Network A is shown wherein the system controller is adapted to configure the status and network for each device.

Figure 8A:
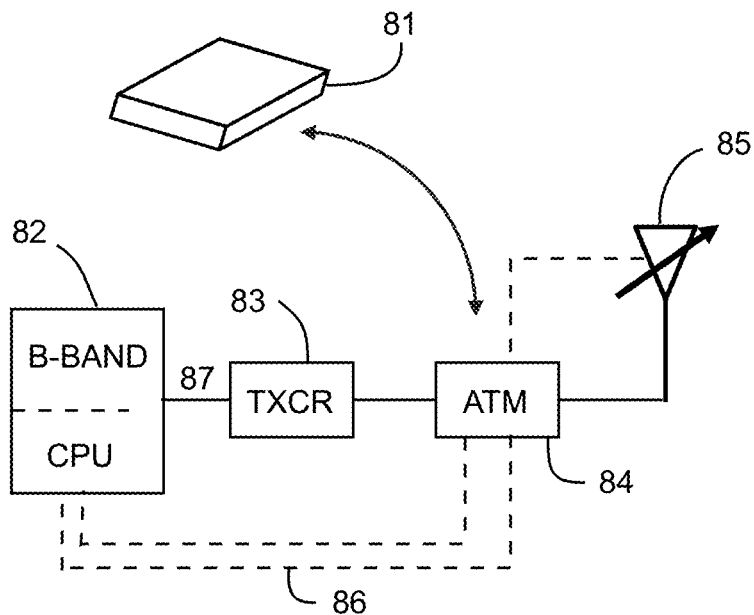
FIGS. 8(A-B) show a communication device where a baseband/transceiver circuit is shown along with an antenna tuning module (ATM), and a corresponding plot of peak gain direction associated with an antenna of the communication device.
Figure 8B:
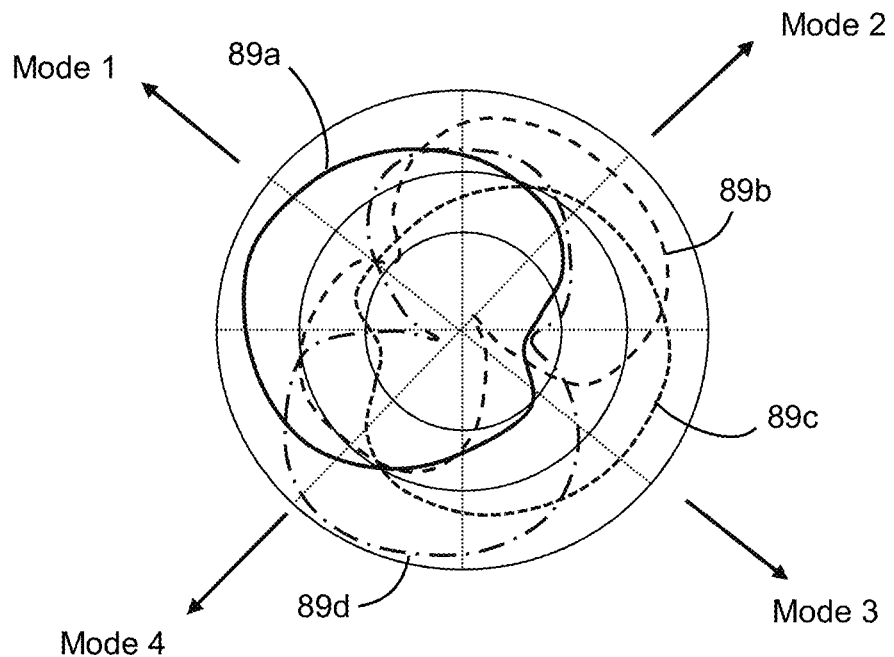

FIG. 8A shows a communication device 81 includes a baseband/transceiver circuit as shown including a baseband/processor 82 coupled to a transceiver 83, an antenna tuning module (ATM) 84, and a modal antenna 85 via control lines 86 and transmission line 87. The Modal antenna 83 is used with circuit 82 to form the communication device 81. An algorithm is used with the processor and the circuit, to configure modes of the modal antenna. Four radiation patterns 89(a-d) associated with the four radiation modes that the Modal antenna can generate is shown, along with the respective directions thereof, in FIG. 8B. Thus, in this embodiment, a modal antenna system, wherein multiple radiation pattern modes can be generated, can be integrated into a radio or access point and radiation modes can be selected to optimize radiation patterns to improve communication link performance.

Figure 9:
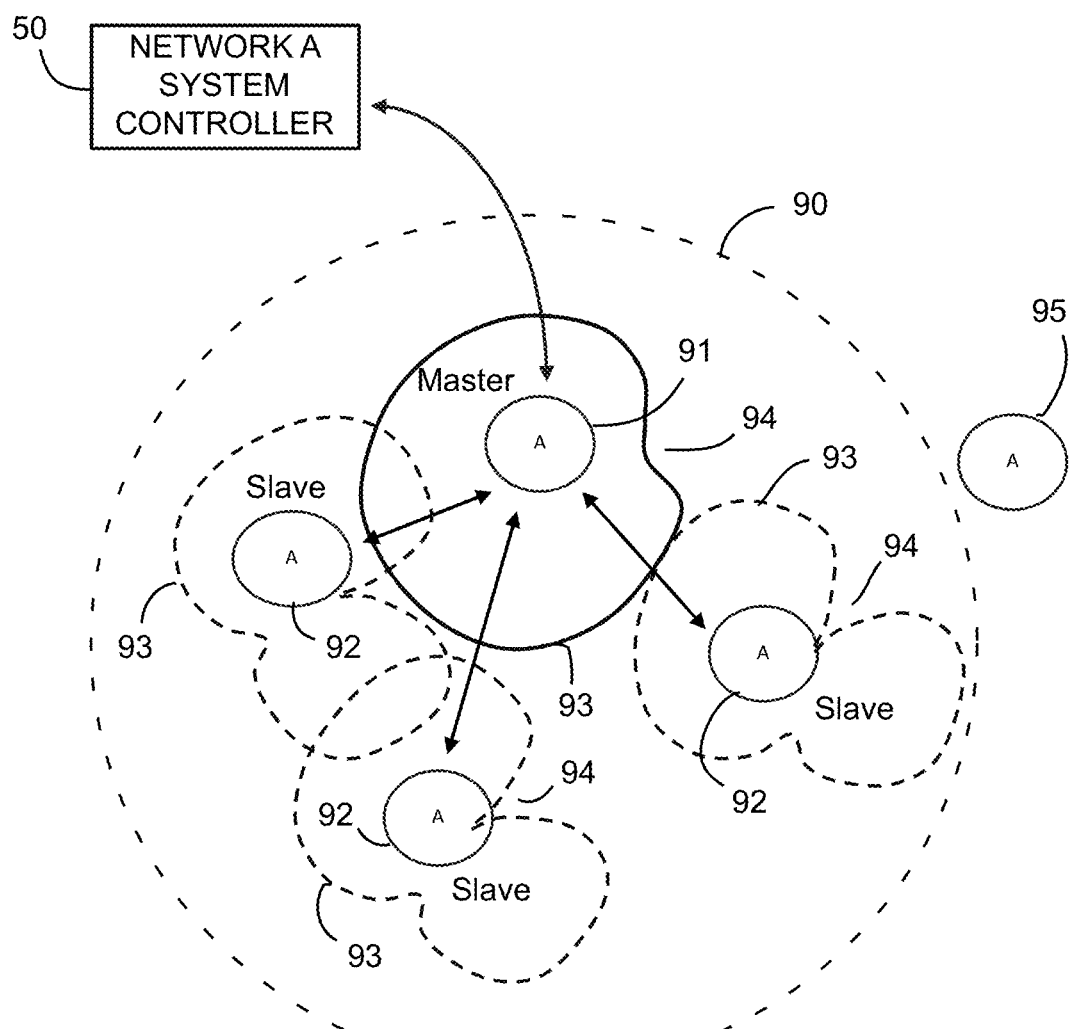
FIG. 9 illustrates an example of radiation pattern selection for the Modal antenna system to optimize communication link between the "master" and "slave" communication devices which form a sub-group of communication devices.

FIG. 9 illustrates an example of radiation pattern selection for the Modal antenna system to optimize communication link between the "master" and "slave" communication devices which form a sub-group of communication devices while minimizing interference from nearby communication devices. Radiation modes are selected by the "master" device to optimize communication link quality. Here, sub group 90 is formed containing a master device 91 and three slave devices 92, each having a respective antenna radiation pattern 93 as shown. Master device 91 is configured with a radiation pattern gain in the direction of the slave devices 92, whereas one or more of the master and slave devices can be configured with an antenna mode having a null 94 steered in a direction of an interferer 95.

Figure 10:
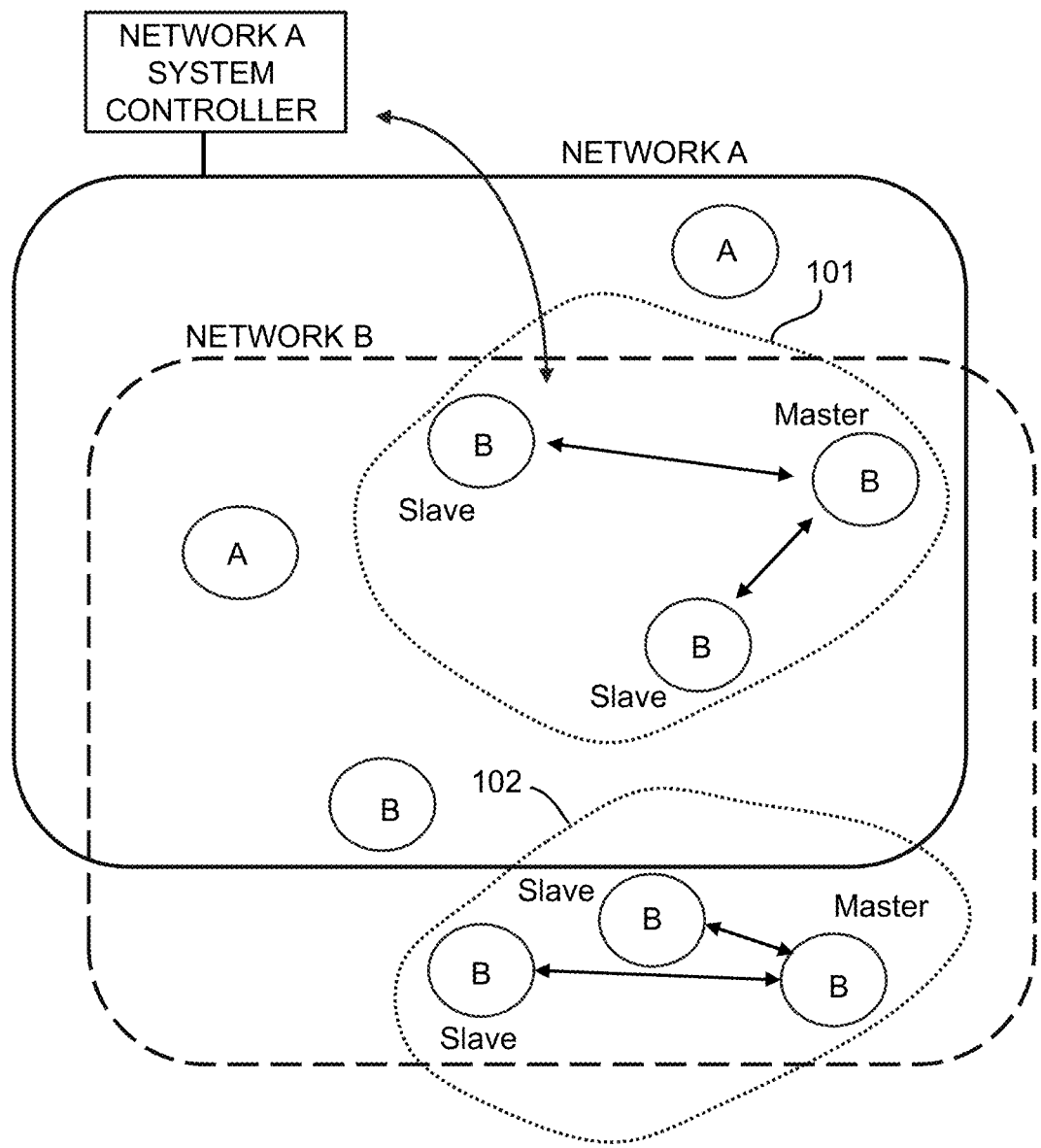
FIG. 10 illustrates the capability of generating two sub-groups from communication devices on two networks and assigning "Master" designation to a communication device in each sub-group.

FIG. 10 illustrates the capability of generating two sub-groups 101; 102, respectively, from communication devices 103 on two networks (Network A and Network B) and assigning "Master" designation to a communication device in each sub-group along with "Slave" designation to remaining devices in each sub group as shown.

What is claimed is:

1. A method for controlling communications in a communication system having a first communication network and a second communication network, the first communication network implementing a different protocol or modulation scheme relative to the second communication network, the method comprising:
   obtaining a designation as a master device in the communication system;
   obtaining data indicative of communication link performance for one or more slave devices in the communication system, the one or more slave devices comprises a modal antenna capable of generating two or more radiation modes in each of the first communication network and the second communication network, each radiation mode associated with a different radiation pattern;
   selecting, for each of the one or more slave devices, a determined network from the first network and the second network for sending one or more communications based at least in part on the data indicative of communication link performance;
   selecting for each of the one or more slave devices, a determined radiation mode from the two or more radiation modes for sending one or more communications; and
   controlling the one or more slave devices based at least in part on the determined network and the determined radiation mode.

2. The method of claim 1, wherein the determined radiation mode is selected based at least in part on the data indicative of communication link performance.

3. The method of claim 1, wherein controlling the one or more slave devices is implemented by the master device.

4. The method of claim 1, wherein the first network is a cellular network.

5. The method of claim 4, wherein the second network is a wireless local area network.

6. The method of claim 4, wherein selecting for each of the one or more slave devices, a determined radiation mode from the two or more radiation modes for sending one or more communications comprises selecting, for each of the one or more slave devices, a determined radiation mode from the two or more radiation modes for sending one or more communications via the determined network.

7. The method of claim 4, wherein selecting for each of the one or more slave devices, a determined radiation mode from the two or more radiation modes for sending one or more communications comprises selecting, for each of the one or more slave devices, a determined radiation mode from the two or more radiation modes for sending one or more communications with another slave device.

8. The method of claim 1, wherein the master device has higher communication link quality with the first network relative to each of the one or more slave devices.

* * * * *